United States Patent
Hiltch et al.

(10) Patent No.: US 9,712,589 B2
(45) Date of Patent: Jul. 18, 2017

(54) SYSTEM AND METHOD FOR PLAYING A VIDEO ON MOBILE WEB ENVIRONMENTS

(71) Applicant: StreamRail Ltd., Tel Aviv (IL)

(72) Inventors: Or Hiltch, Rishon LeZion (IL); Guy Zipori, Kfar Saba (IL)

(73) Assignee: ironSource Ltd., Tel Aviv (IL)

( * ) Notice: Subject to any disclaimer, the term of this patent is extended or adjusted under 35 U.S.C. 154(b) by 161 days.

(21) Appl. No.: 14/631,007

(22) Filed: Feb. 25, 2015

(65) Prior Publication Data

US 2016/0248833 A1    Aug. 25, 2016

(51) Int. Cl.
| | |
|---|---|
| *G06F 15/16* | (2006.01) |
| *H04L 29/06* | (2006.01) |
| *H04N 19/44* | (2014.01) |
| *H04N 1/60* | (2006.01) |
| *H04L 29/08* | (2006.01) |

(52) U.S. Cl.
CPC .......... *H04L 65/604* (2013.01); *H04L 67/32* (2013.01); *H04N 1/6002* (2013.01); *H04N 19/44* (2014.11)

(58) Field of Classification Search
None
See application file for complete search history.

(56) References Cited

U.S. PATENT DOCUMENTS

| | | | |
|---|---|---|---|
| 9,402,112 B1* | 7/2016 | Levine | ................. H04N 21/812 |
| 2003/0142039 A1 | 7/2003 | Minear et al. | |
| 2005/0227679 A1 | 10/2005 | Papulov | |
| 2016/0162954 A1* | 6/2016 | Kang | ................. G06Q 30/0269 |
| | | | 705/14.27 |

FOREIGN PATENT DOCUMENTS

| | | |
|---|---|---|
| EP | 1510955 A2 | 3/2005 |
| RU | 02192049 | 10/2002 |

OTHER PUBLICATIONS

The International Search Report and the Written Opinion of the International Searching Authority for PCT/US2016/019124, ISA/RU, Moscow, Russia, Date of Mailing: Jun. 6, 2016.

* cited by examiner

*Primary Examiner* — Brian Whipple
(74) *Attorney, Agent, or Firm* — M&B IP Analysts, LLC

(57) ABSTRACT

A method and mobile computing device for auto-playing a video clip within a web environment of a mobile computing device are provided. The method comprises including an auto-play script in a webpage downloaded to the web environment, wherein the web environment is disabled to auto-play video clips; and executing the auto-play script within the web environment, wherein the execution of the auto-play script causes at least: receiving the video clip from an external source and automatically playing the video clip in the web environment.

23 Claims, 4 Drawing Sheets

SYSTEM AND METHOD FOR PLAYING A VIDEO ON MOBILE WEB ENVIRONMENTS

TECHNICAL FIELD

The present disclosure generally relates to video playback on mobile devices, and more particularly, to video playback in mobile web browsers on mobile devices.

BACKGROUND

Computation of online video, such as clips and movies, continues its inimitable rise. Online videos are expected to be prominent sources of advertisements. As such, video playback is considered an essential feature of modern computing devices. This is especially true in mobile computing devices, for example, smartphones, music players (e.g., iPad®), wearable computing devices, tablet computers, game consoles, and the like.

Currently, consumption of multimedia content and specifically online video through mobile computing devices is through a mobile application ("app") or web browsers. A mobile application (such as a native application or a web application) is programmed to serve content to users. As such, a mobile application can be programmed or configured to allow auto play of online video. Auto play refers to the ability to play video (or other content) as the video is uploaded to the mobile computing device. That is, a user of such a device is not required to "press" or "tap" on a play button. As an example, mobile applications provided by Facebook® and YouTube® enable automatic playback of videos.

In contrast to the mobile applications uniquely or purposely designed to enable auto play of online video, operating systems of mobile computing devices disable such a feature in standard web browsers. Specifically, such operating systems disable the operation of HTML5 new syntactic features. Such HTML5 features are defined in HTML5 using, for example, video, canvas, and object tags. Currently, web browsers, such as Chrome® for Android® and Safari® for iOS®, do not implement HTML5 syntactic features. As a result of this limitation, current mobile web browsers cannot play video using HTML5.

One solution discussed in the related art to allow auto play of video is through resources universally supported by mobile web browsers. The solution divides a video sequence into a silent video stream and an audio stream. Then, still images are extracted from the silent video stream and later combined into a composite image. This process is performed by a server communicatively connected mobile computing devices.

To play the composite image as a video sequence, the existing solution loads the composite image through a viewport, selects one of the still images of the composite image, sets the viewport to display the selected still image, and sets a timer for a specified time period, so that at the expiration of the time period the next still image is displayed in the view port until the entire composite image is displayed.

Existing solutions that are based on imaging a video stream suffer from various limitations. The video quality is sacrificed as a result of segmenting the video into still images. As such, high definition or high quality video cannot be played to their required quality. Furthermore, such existing solutions require pre-processing by a server to generate the composite image. Therefore, video to be displayed on computing devices cannot be updated in real-time.

It would be therefore advantageous to provide a solution for allowing auto playback of video on mobile computing devices that overcomes at least the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor delineate the scope of any or all aspects. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Certain embodiments include a method for auto-playing a video clip within a web environment of a mobile computing device. The method comprises including an auto-play script in a webpage downloaded to the web environment, wherein the web environment is disabled to auto-play video clips; and executing the auto-play script within the web environment, wherein the execution of the auto-play script causes at least: receiving the video clip from an external source and automatically playing the video clip in the web environment.

Certain embodiments also include a mobile computing device comprising at least one processor; and a memory, the memory containing instructions that, when executed by the at least one processor, configure the mobile computing device to: include an auto-play script in a webpage downloaded to a web environment, wherein the web environment is disabled to auto-play video clips; and execute the auto-play script within the web environment, wherein the execution of the auto-play script by the at least one processor causes at least: receiving the video clip from an external source and automatically playing the video clip in the web environment.

Certain embodiments further include a method for auto-playing a video clip within a web environment of a mobile computing device according to preconfigured dimensions. The method comprises including an auto-play script in a webpage downloaded to the web environment, wherein the auto-play script is preconfigured with dimensions to display the video clip on a screen of the computing mobile device; and executing the auto-play script within the web environment, wherein the execution of the auto-play script causes at least: receiving the video clip from an external source and automatically playing the video clip in the web environment, thereby causing the display of the video clip on the computing mobile device according to the preconfigured dimensions.

Certain embodiments also include a mobile computing device configured to for auto-playa video clip within a web environment of a mobile computing device according to preconfigured dimensions. The mobile computing device comprises at least one processor; and a memory, the memory containing instructions that, when executed by the at least one processor, configure the mobile computing device to: include an auto-play script in a webpage downloaded to a web environment, wherein the web environment is disabled to auto-play video clips; and execute the auto-play script within the web environment, wherein the execution of the auto-play script by the at least one processor causes at least:

receiving the video clip from an external source and automatically playing the video clip in the web environment.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
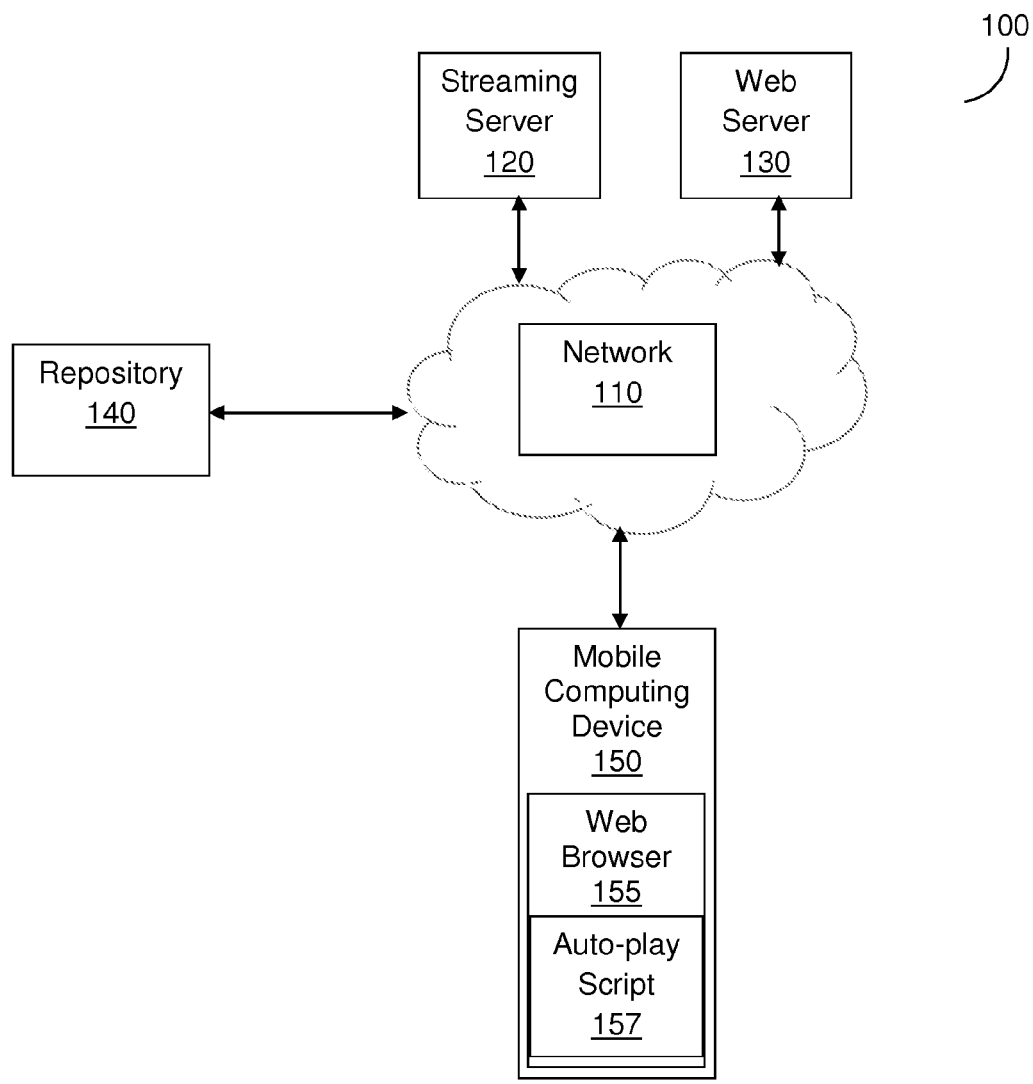
FIG. 1 is a schematic diagram of a network system utilized to describe the various disclosed embodiments.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary and non-liming schematic diagram of a network system 100 utilized to describe the various disclosed embodiments. As illustrated in FIG. 1, to a network 110 there are connected a video streaming server 120, a web server 130, a repository 140, and a mobile computing device 150. It should be noted that singular elements are shown in FIG. 1 and discussed herein, merely for the sake of simplicity.

The network 110 may be, for example, the Internet, a local area network, a wide area network, and the like. The mobile computing device 150 may be, but is not limited to, a smartphone, a tablet computer, a wearable computing device, and the like. The mobile computing device 150 executes an operating system, such as iOS®, Android®, Windows® mobile, and the like and a web browser, such as Safari®, Chrome®, Firefox®, and the like. In an embodiment, the operating system of the mobile computing device 150 disables the execution of at least a HTML5 video tag.

The streaming server 120 provides the video content to be played on the mobile computing device 150. The streaming server 120 may be part of a content delivery network (CDN), an advertising (ad) network, a streaming server operated by a content provider, such an over the top (OTT) content provider, and so on. In certain embodiment, the video clip may be locally stored in the mobile computing device 150. The video content may be, for example, a movie, a clip, an advertisement, etc. (and will be referred hereinafter as a "video clip").

In an exemplary configuration, the web server 130 hosts websites that display video content provided by the streaming server 120. The repository 140 is utilized to store an auto-play script 157 causing an auto play of the video clip provided by the streaming server 120 in a web browser 155 of the mobile computing device 150. In an embodiment, an auto-play script 157 is executable code written in a scripting language including, but not limited to, JavaScript. The repository 140 may be a non-transitory readable medium accessible by the mobile computing device 150. In certain configurations, the repository 140 may be implemented in the streaming server 120, the web server 130, the mobile computing device 150, or in any network device (e.g., a proxy server, a HTTP proxy, etc.) communicatively connected to the device 150.

In an embodiment, the repository 140 can be preinstalled with a plurality of auto-play scripts 157, each of which is configured to support a different codec. Further, the auto-play scripts 157 can be updated in a centralized location without changing or modifying the operation of any of the computing mobile device 150, streaming server 120, and/or application server.

According to the various disclosed embodiments, any time that a new webpage is downloaded to the web browser 155, an instance of the auto-play script 157 is injected into the downloaded webpage. In one embodiment, an instance of the auto-play script 157 is injected by an HTTP proxy or any other similar component configured to modify the network stack of the web browser 155. In other embodiments, the auto-play script 157 may be included in the webpage downloaded to the web browser 155.

It should be noted that the web browser may include any web environments executed by the computing device 150. Such environments include, but are not limited to, a web browser, a mobile application, a web application, a native application, and so on. It should be emphasized that the web browser 150 and any of the web environments are disabled to interpret any code, such HTML5 'video' tags, that enables the auto play of video.

Once injected to or downloaded with the webpage, a processing of the auto-play script 157 by the web browser 155 provides complete video functionality including auto-play functionality. In an embodiment, a call to the auto-play script 157 in the webpage (for example, using an HTML 'script') can replace the native HTML5 'video' tag.

In some embodiments, disclosed in detail below, at least one native video decoder is cross-compiled into the auto-play script 157. Any video clip designated in the downloaded webpage is retrieved from the streaming server 120. The bytes of the retrieved video are decoded from the appropriate codec to their pre-encoded state, preferably as the video is streamed to the mobile computing device 150. Using the decoded bytes, the video frames are composed and then rendered to be displayed in the webpage downloaded to the mobile computing device 150.

In an embodiment, the rendering is performed using an HTML 'canvas' tag. In such an embodiment, the composed video frames are converted into a Red-Green-Blue color space to allow rendering using an HTML 'canvas' tag. Therefore, the auto-play script 157 allows rendering and smooth playing of video frames. It should be noted that the video decoder complied into the auto-play script 157 is coded completely using a scripting programming language, such as JavaScript. In an embodiment, the video decoder executed by the auto-play script 157 can support any video format including, but not limited to, H.263, H.264 AVC, MPEG-4 SP, VP8, and the like.

It should be noted that the auto-play script 157 is completely executed in the web browser 155 and does not require any pre-processing of the video by the streaming server 120, web server 130 or the repository 140 in order to enable the auto-play by the web browser 155. As such, according to one embodiment, the video to be played on the mobile computing device 150 can be changed in real-time, merely by changing the file name of the video that the auto-play script 157 should retrieve.

The mobile computing device 150 typically includes at least one processing unit and a tangible memory (both not shown) for storing instructions processed by the at least one processing unit. In a preferred embodiment, the processing unit is configured to process and execute the instructions of the auto-play script 157.

The processing unit may comprise, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing unit may also include machine-readable media for storing software. Software should be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing unit, cause the processing unit to perform the various functions.

Figure 2:
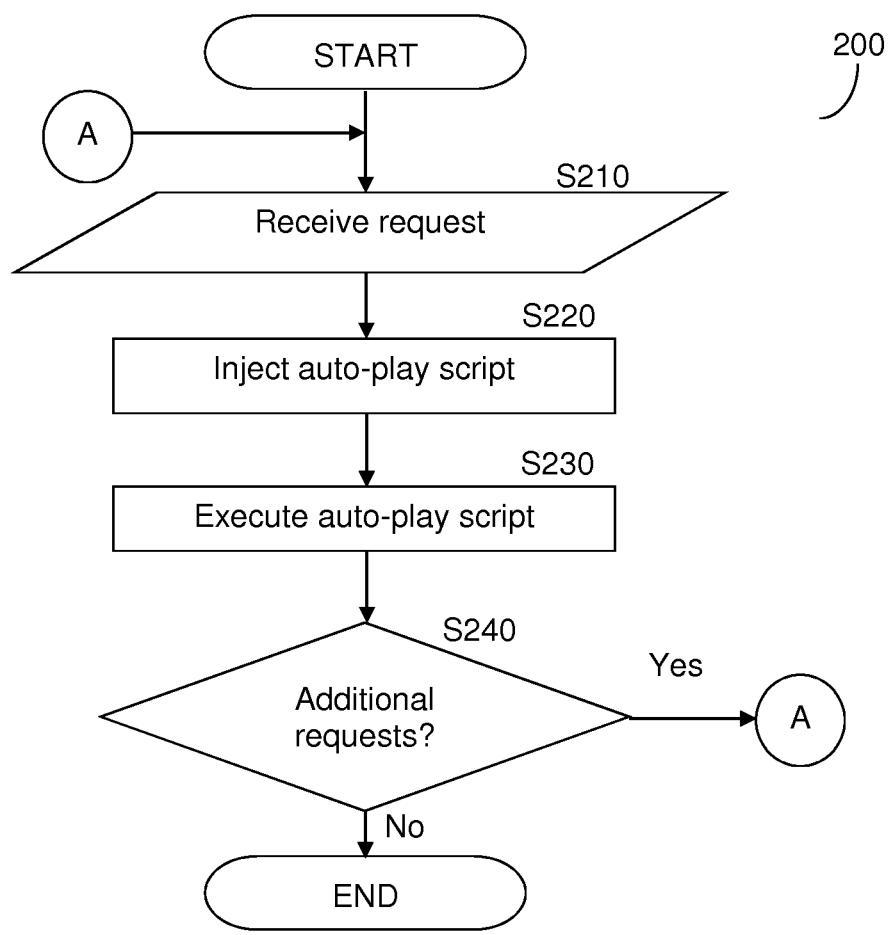
FIG. 2 is a flowchart describing the process of enabling auto-play of video clips by mobile computing devices according to an embodiment.

FIG. 2 shows an exemplary and non-limiting flowchart 200 describing the process of enabling auto-play of video clips by mobile computing devices according to an embodiment.

At S210, the operation starts when a request from a webpage downloaded on a mobile computing device is received. The request is to retrieve and execute the auto-play script in the web environment. The request may be received by the proxy server or any other repository hosting the auto-play script. The request may be designated in the webpage using, for example, an HTML 'script' tag that may include a link (e.g., a URL) to the auto-play script.

At S220, the auto-play script is injected into the webpage. In an embodiment, the auto-play script is downloaded together with the webpage to the web environment. In an embodiment, the auto-play script is downloaded or injected into the webpage only once, regardless of the number of video clips embedded in the webpage.

At S230, the auto-play script is executed by the web environment (e.g., the browser) enabling the auto-play of any video designated in the webpage. That is, once the auto-play script runs as part of the webpage, a user of the mobile computing device does not need to take any action to enable the display of the video. For example, if the webpage downloaded to the computing device includes an online advertisement, the advertisement is automatically played as part the webpage. The auto-play script is active only during a session when the associated webpage is active. That is, if the user navigates away from the downloaded webpage or closes the browsers the auto-play script becomes inactive. The operation of S230 is described in greater detail with respect to FIG. 3.

In one embodiment, the execution of the script, and hence the automatic playing of the video clip, is triggered when the webpage is loaded to the web browser on the mobile computing device. In another embodiment, the execution of the script, and hence the automatic playing of the video clip is triggered upon detection of user gestures. The user gesture may include, but is not limited to, tap, pan, zoom, rotate (of a screen or device), press and tap, mouse clip, mouse over, and so on.

At S240, it is checked whether there are additional requests generated by a web environment, and if so execution continues with S210; otherwise, execution terminates.

Figure 3:
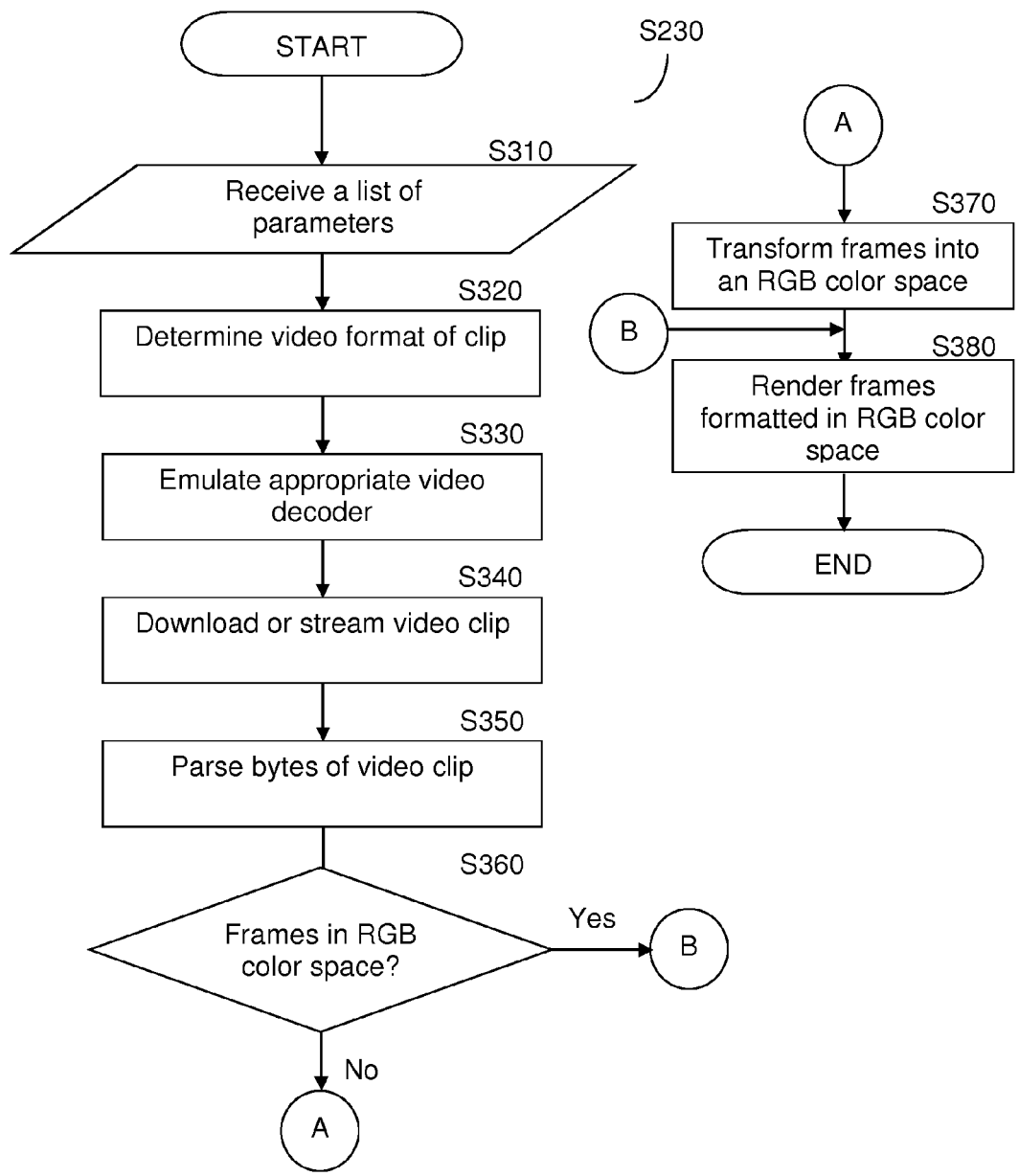
FIG. 3 is a flowchart describing the operation of the auto-play script according to one embodiment.

FIG. 3 shows an exemplary and non-limiting flowchart S230 describing the operation of the auto-play script according to one embodiment. The method will be described with a reference to a specific embodiment for auto-playing only one video clip referenced in the webpage, merely for the sake of simplicity. It should be emphasized that the auto-play script can play a plurality of video clips embedded in a webpage in parallel and/or according to a predefined timing sequence.

At S310, a list of parameters related to the video clip in the downloaded webpage is received. The parameters include a link (e.g., a URL) to the video clip, dimensions (number of bytes) of the video clip, and optionally any optimizing flags (e.g., web workers) associated with the clip. In an exemplary embodiment, the list of parameters may be provided to a function included in the auto-play script 157.

The function may be obtained the parameters from any network or file system source (e.g., a remote web server, etc.).

At S320, the video format of the video clip is determined. This can be performed based on, for example, a file name extension (e.g., '.mp4') designated in the URL, analysis of the video clip on-the-fly, a source (e.g., streaming server) of the video clip, the function described above, and so on.

At S330, respective of the determined video format an appropriate video decoder that can decode the contents of the video clip is emulated. For example, for an '.mp4' type of video, typically an H.264 decoder is emulated. It should be noted that the video decoder is a native decoder (e.g., H.264 decoder) emulated in a pure scripting language (e.g., JavaScript). That is, no native code (for example, C++ and the like) is processed by the web browser and/or the auto-play script. In an embodiment, once the video format is determined, the appropriate emulated decoder is retrieved, by the auto-play script, from the repository 140.

An exemplary and non-limiting embodiment for emulating a video decoder may include processing a native video decoder (e.g., an H.264 Android StageFright decoder programmed using a native programming language (e.g., C++, and the like) and a JavaScript transpiler. The output should contain JavaScript methods for decoding video bytes. The result of such processing is an 'avc-codec.js' file (audio/video decoder). Different emulated video decoders for different codecs can be saved in the repository 140.

At S340, the video clip is downloaded or otherwise streamed to the mobile computing device, for example, from the streaming server 120. In an embodiment, S340 is performed in response to a request sent by the auto-play script.

At S350, the received video clip's bytes are parsed to determine at least the location of the video track and encoded video frames. At S360, the encoded video frames are decoded using an emulated video decoder. In an embodiment, an optimization is set for the video (respective of the received optimizing flags). For example, one optimization includes decoding the video frames in parallel. S350 results in a set of decoded video frames composing the video clip.

At S360, a check is made to determine if the decoded video frames are in a RGB color space; and if so, execution proceeds with S380; otherwise, at S370, the decoder video frames are transformed to an RGB color space. The transformation is performed using the size parameter. An embodiment for converting video frames from a YUV to RGB color space is described below with reference to FIG. 4.

At S380, the decoder video frames formatted in a RGB color space are rendered. The rendering would cause the display of the video content the webpage downloaded to the mobile computing device. In an embodiment, the rendering is performed by an HTML5 'canvas' tag. One of ordinary skill should be familiar with the operation of the 'canvas' tag.

Following is a non-limiting example for auto-playing a 'mp4' type of video clip by the auto-play script according to the disclosed embodiments. In this example, the auto-play script is coded using a JavaScript. The JavaScript is executed in a webpage (by a browser) that obtains the bytes of the video. This is performed by means of an XmlHttpRequest and requesting a response type of ArrayBuffer of Blob. The NAL units are extracted from the obtained video bytes.

Thereafter, each NAL unit is decoded using the emulated video decoder. In this example, a H.264 emulated video decoder is utilized and the type of the video clip is mp4. In certain implementations, the call to the decode NAL units is offloaded by utilizing a Web-Worker per NAL unit. This is a multi-threaded implementation that improves the performance of the decoding process.

The decoding of the NAL units would result in video frames having components encoded in a YUV color space. Thus, the script converts such components to a RGB color space to be able to draw them to a HTML5 canvas. In an embodiment, such conversion is performed using WebGL.

Figure 4:
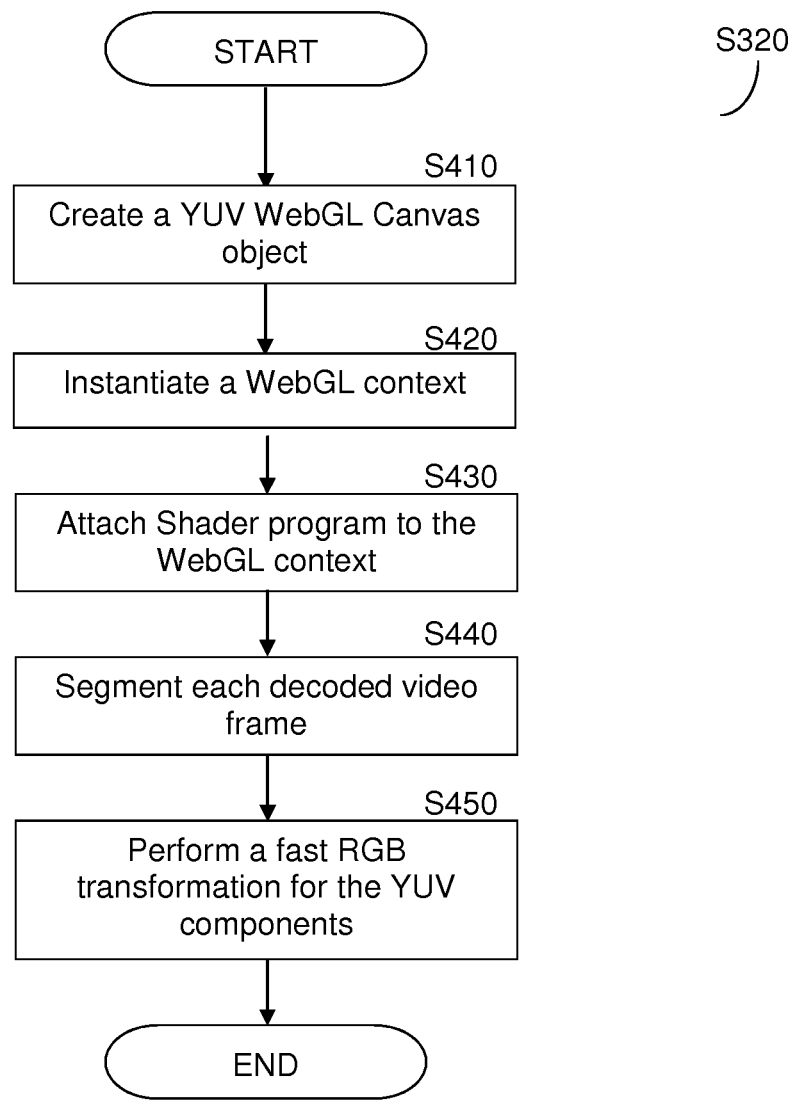
FIG. 4 is a flowchart for performing a WebGL conversion according to one embodiment.

Referring now to FIG. 4 where an exemplary and non-limiting flowchart 400 for performing the WebGL conversion according to one embodiment is shown. At S410, an object, such as a specialized YUV WebGL canvas object, is created. In an embodiment, this object is configured to process vertex and fragment Shaders. In order to create the object, a WebGL canvas (for example, "experimental-webgl" context) is requested from a HTML5 canvas object.

At S420, a WebGL context is instantiated, and at S430 a Shader program is attached to the WebGL context. The Shader program, as utilized by WebGL, converts shape data into pixels on the screen. In an embodiment, S430 is performed by attaching and compiling vertex and fragment Shaders. Shaders may be created using the "x-shader/x-fragment" script with the Shader information. The Shaders perform S430 in combination with the Y, U and V components.

At S440, each decoded video frame is segmented, using the YUV WebGL canvas object, into the YUV components. Specifically, the operation includes taking a certain number of bytes from the luma and chroma (respectively the Luma size and Chroma size) buffers. In an embodiment, the Luma size is determined by the width and height of the frames of which the video is comprised of. Specifically, the Luma size is a multiplication of the width and height. The Chroma size is a function of the Luma size. Then, the YTexture, UTexture, and VTexture are filled using the bytes of the YUV frames with the values computed for the Chroma size and Luma size. Each of the YTexture, UTexture, and VTexture textures are objects bound to a WebGL TEXTURE_2D object, a shader program, dimensions, and location properties. The values for the Y, U, and V textures are filled using the data obtained from the decoded frames.

At S450, a fast RGB transformation of the YUV components is performed by the YUV WebGL Canvas object. This also includes rendering the resulting RGB images into the HTML5 canvas. In an embodiment, step S450 is iteratively repeated every predefined time-interval to achieve a playing video effect.

It should be noted that the WebGL conversion utilizes the graphical processing unit (GPU) of the mobile computing device, therefore enabling fast transformation.

The disclosure has been described with a reference to an embodiment where the auto-play script allows playing of video clips in mobile computing devices when video tags are disabled. It should be appreciated that the auto-play script can be also utilized to replace or operate with conjunction with video tags enabled by an operating system of the device.

This would provide additional advantages over the playing of video clips by traditional methods employed by operating system. As a non-limiting example, the operating system iOS® always plays (through a video tag) a video clip at a full screen. This is a limiting factor to the design/operation of applications and/or display of webpages. The disclosed embodiments allow replacing a call to a video tag with a call to the auto-play script. The auto-play script may be configured to play the video clip at any dimension (as defined by the set of parameters defined above). Thus, a video clip played by the auto-play script is displayed according to the configured dimension.

The embodiments disclosed herein may be implemented in hardware, software, firmware, or any combinations thereof. The software may be implemented as an application program tangibly embodied on a program storage unit or computer readable medium. The application program may be uploaded to, and executed by, a machine comprising any suitable architecture, for example a computer platform having hardware such as one or more central processing units ("CPUs"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure. All examples and conditional language recited herein are intended for pedagogical purposes to aid the reader in understanding the principles of the disclosed embodiments and the concepts contributed by the inventors to furthering the art, and are to be construed as being without limitation to such specifically recited examples and conditions.

All statements herein reciting principles, aspects, and embodiments of the disclosure, as well as specific examples thereof, are intended to encompass both structural and functional equivalents thereof. It is intended that such equivalents include both currently known equivalents as well as equivalents developed in the future, i.e., any elements developed that perform the same function, regardless of structure. Other hardware, conventional and/or custom, may also be included.

What is claimed is:

1. A method for auto-playing a video clip within a web environment of a mobile computing device, comprising:
   including an auto-play script in a webpage downloaded to the web environment, wherein the web environment is disabled to auto-play video clips; and
   executing the auto-play script within the web environment, wherein the execution of the auto-play script causes at least: receiving the video clip from an external source and automatically playing the video clip in the web environment.

2. The method of claim 1, wherein executing the auto-play script within the web environment further comprises:
   receiving a set of parameters related to the video clip;
   downloading video bytes of the video clip from the external resource;
   parsing the downloaded video bytes to detect at least encoded video frames;
   decoding the encoded video frames using an emulated video decoder; and
   rendering the decoded video frames into the web environment.

3. The method of claim 2, further comprising:
   determining a video format of the video clip;
   using the emulated video decoder respective of the determined video format.

4. The method of claim 2, wherein rendering the decoded video frames into the web environment is performed using an HTML5 canvas tag.

5. The method of claim 2, wherein the emulated video decoder is coded using a scripting programming language.

6. The method of claim 5, wherein the auto-play script is coded using a scripting programming language, wherein the scripting programming language is at least a JavaScript.

7. The method of claim 2, further comprising:
   determining if a color space of the decoded video frames is a YUV color space; and
   converting the decoded video frames having a YUV color space into a RGB color space, upon determining if the color space of the decoded video frames is a YUV color space.

8. The method of claim 7, wherein converting the decoded video frames from the YUV color space into the RGB color space further comprises:
   performing a WebGL conversion.

9. The method of claim 8, wherein performing the WebGL conversion further comprises:
   creating a YUV WebGL canvas object;
   instantiating a WebGL context with a shader program;
   segmenting, using the object, each decoded video frame into YUV components;
   performing, using the object, a red-green-blue (RGB) transformation of the YUV components, wherein the RGB transformation results in RGB images;
   rendering video using the RGB images.

10. The method of claim 9, wherein the rendering of the RGB images further comprises: repetitively rendering RGB images into a HTML5 canvas.

11. The method of claim 1, wherein the web environment includes any one of: a web browser, a mobile application, a web application, and a native application.

12. A non-transitory computer readable medium having stored thereon instructions for causing one or more processing units to execute a process for auto-playing a video Clip within a web environment of a mobile computing device, the process comprising:
   including an auto-play script in a webpage downloaded to the web environment, wherein the web environment is disabled to auto-play video clips; and
   executing the auto-play script within the web environment, wherein the execution of the auto-play script causes at least: receiving the video clip from an external source and automatically playing the video clip in the web environment.

13. A mobile computing device, comprising:
   at least one processor; and
   a memory, the memory containing instructions that, when executed by the at least one processor, configure the mobile computing device to:
   include an auto-play script in a webpage downloaded to a web environment, wherein the web environment is disabled to auto-play video clips; and
   execute the auto-play script within the web environment, wherein the execution of the auto-play script by the at least one processor causes at least: receiving the video clip from an external source and automatically playing the video clip in the web environment.

14. The mobile computing device of claim 13, wherein the mobile computing device is further configured to:
   receive a set of parameters related to the video clip;
   download video bytes of the video clip from the external resource;
   parse the downloaded video bytes to detect at least encoded video frames;
   decode the encoded video frames using an emulated video decoder; and
   render the decoded video frames into the web environment.

15. The mobile computing device of claim 13, wherein the mobile computing device is further configured to:
   determine a video format of the video clip;
   use the emulated video decoder respective of the determined video format.

16. The mobile computing device of claim 14, wherein rendering the decoded video frames into the web environment is performed using an HTML5 canvas tag.

17. The mobile computing device of claim 16, wherein the emulated video decoder is coded using a scripting programming language.

18. The mobile computing device of claim 17, wherein the auto-play script is coded using a scripting programming language, wherein the scripting programming language is at least a JavaScript.

19. The mobile computing device of claim 14, wherein the mobile computing device is further configured to:
   determine if a color space of the decoded video frames is a YUV color space;
   convert the decoded video frames having a YUV color space into a RGB color space, upon determining if the color space of the decoded video frames is a YUV color space.

20. The mobile computing device of claim 19, wherein the mobile computing device is further configured to: perform a WebGL conversion to convert the decoded video frames having a YUV color space into a RGB color space.

21. The mobile computing device of claim 20, wherein the mobile computing device is further configured to:
   create a YUV WebGL canvas object;
   instantiate a WebGL context with a shader program;
   segment, using the object, each decoded video frame into YUV components;

perform, using the object, a red-green-blue (RGB) transformation of the YUV components, wherein the RGB transformation results in RGB images;

render video using the RGB images.

22. The mobile computing device of claim 21, wherein the mobile computing device is further configured to:

repetitively render RGB images into a HTML5 canvas.

23. The mobile computing device of claim 13, wherein the web environment includes any one of: a web browser, a mobile application, a web application, and a native application.

* * * * *